Dec. 25, 1945. O. O. RIESER 2,391,478
DEVICE FOR TREATING STORAGE BATTERY CELL COVERS
Original Filed March 13, 1940 4 Sheets-Sheet 4

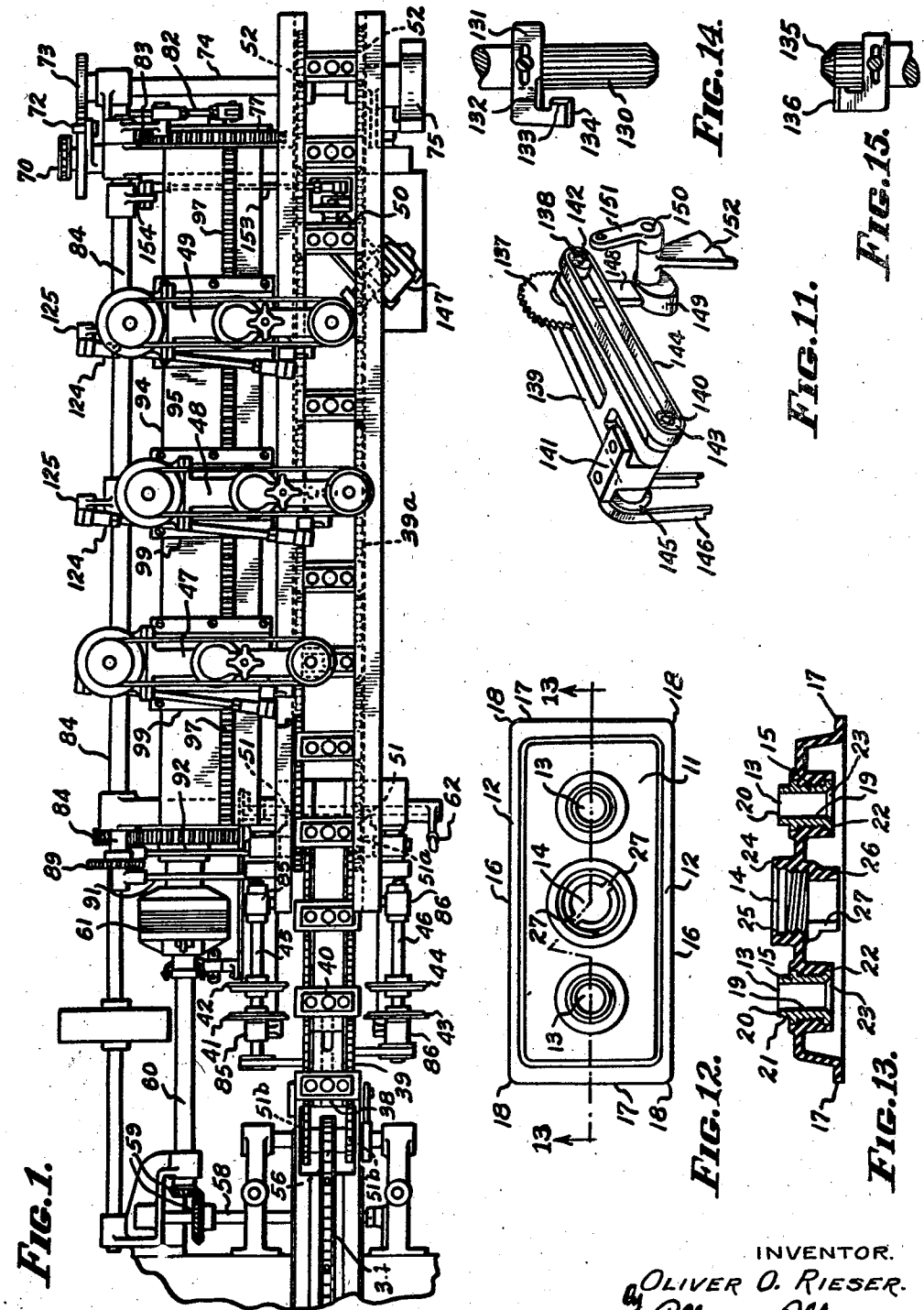

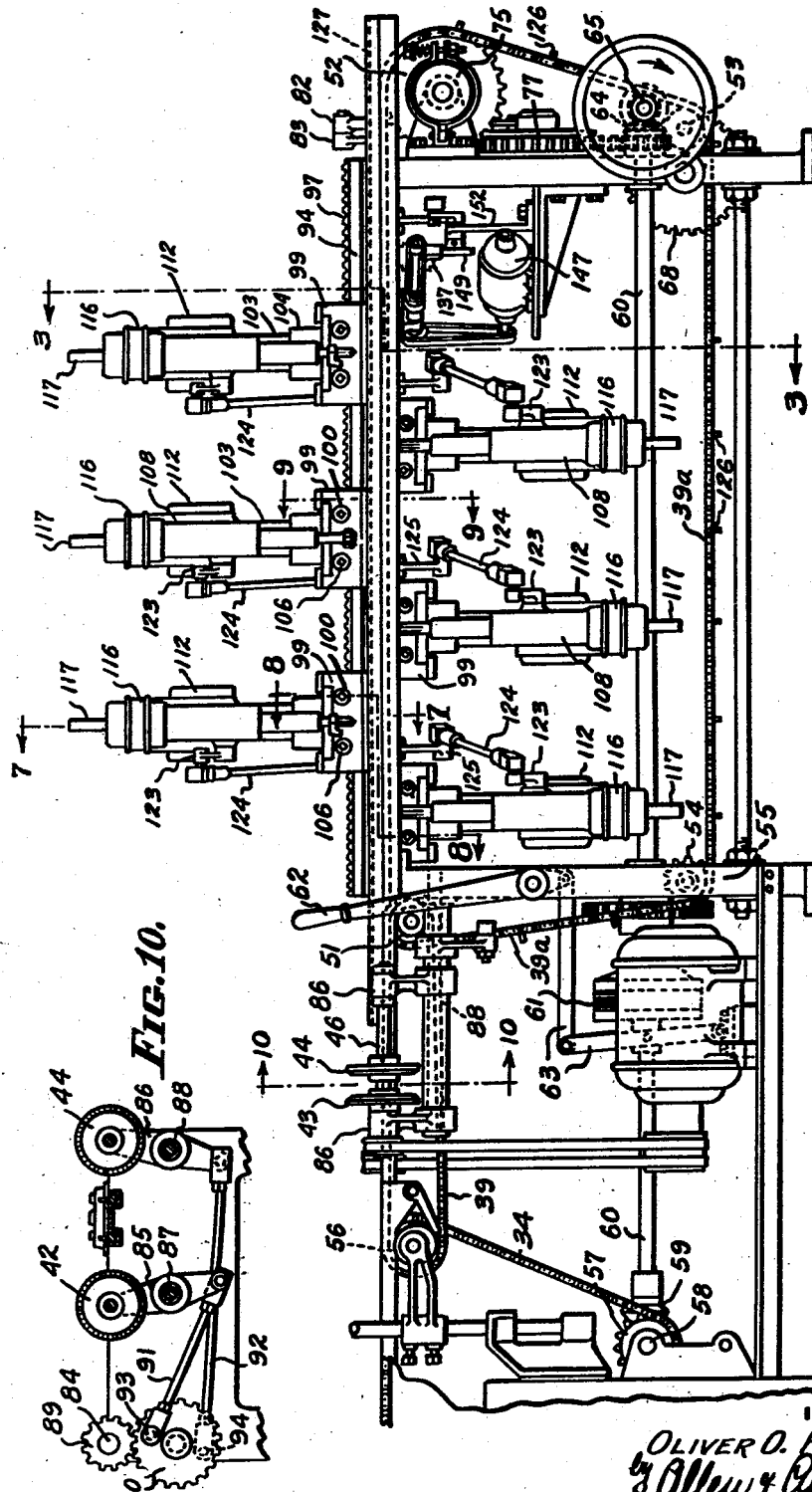

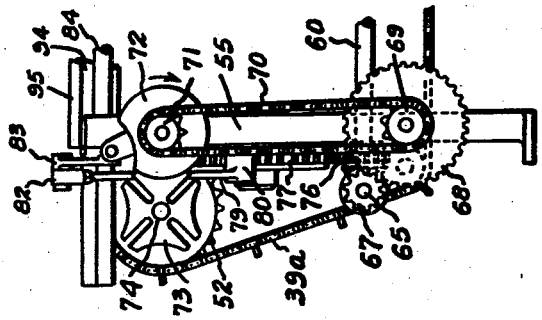
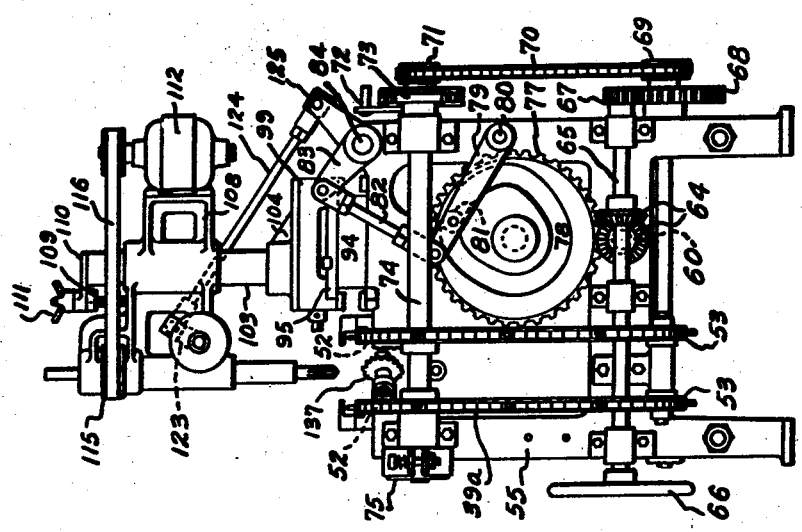
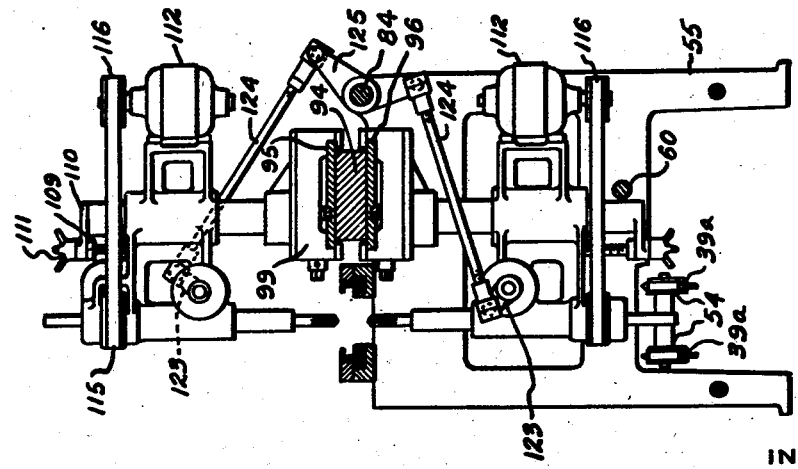
INVENTOR.
OLIVER O. RIESER.
by Allen & Allen
ATTORNEYS.

INVENTOR.
OLIVER O. RIESER.
by Allen & Allen
ATTORNEYS.

Patented Dec. 25, 1945

2,391,478

UNITED STATES PATENT OFFICE 2,391,478

DEVICE FOR TREATING STORAGE BATTERY CELL COVERS

Oliver O. Rieser, Oak Park, Ill., assignor to The Richardson Company, Lockland, Ohio, a corporation of Ohio Application March 13, 1940, Serial No. 323,784, now Patent No. 2,342,012, dated February 15, 1944, which is a division of application Serial No. 182,789, December 31, 1937, now Patent No. 2,212,402, dated August 20, 1940. Divided and this application July 2, 1942, Serial No. 449,453

3 Claims. (Cl. 51—80)

This is a division of my copending application of the same title, Serial No. 323,784, filed March 13, 1940, which matured into Patent No. 2,342,012, dated February 15, 1944, and which, in turn, is a division of my application, Serial No. 182,789, filed December 31, 1937, which matured into Patent No. 2,212,402, dated August 20, 1940.

Cell covers of storage batteries are usually moulded of a vulcanizable rubber composition. Following the moulding operation a number of after treatments are required, including the removal of fins and the like, and also including truing up the side and end edges by grinding. Devices have hitherto been employed for the grinding of the side and end edges of a cell cover in a more or less automatic way. Such devices involved at least a pair of conveyors at right angles to each other, upon which conveyors cell covers were moved along both in sidewise and in endwise positions and during such movement were subjected to the action of oppositely disposed grinding means. In one sense the invention hereinafter to be described may be regarded as an addition to such means, since where such means are employed it is advantageous to cause them to feed the storage battery cell covers into the means of my invention.

With the exception of the grinding of the side and end edges of storage battery cell covers, however, all other finishing operations on such cell covers have hitherto been carried on by hand. These operations include the removal of fins, the removal of portions of moulded product covering terminal and/or vent openings, the grinding of the corners of the storage battery cell cover, the reaming of openings, the reaming of the usual slot or gas groove in the skirt surrounding the vent opening and the like. With the development of more modern types of storage battery cell covers, additional reaming operations are required, including the reaming of the center perforations in metallic inserts to which terminal posts will be fused, the reaming of external portions of metallic inserts, and the like. In plants producing storage battery cell covers, there has always hitherto been a long finishing and inspection line including a very large number of operators armed with knives, reamers and the like.

The fundamental object of my invention is the provision of means and a method whereby these multifarious operations are carried on by machine rather than by hand. Other and ancillary objects of my invention will be apparent to one skilled in the art upon reading these specifications or will be set forth hereinafter. I accomplish these various objects by that certain construction and arrangement of parts of which I shall now describe an exemplary embodiment. Reference is therefore made to the drawings in which:

Figure 1 is a top plan view of my device.

Figure 2 is a side elevation thereof.

Figure 3 is a sectional view taken along the lines 3—3 of Figure 2.

Figure 4 is an end elevation of the machine taken from the right hand end.

Figure 5 is a side elevational view of a portion of the mechanism shown in Figure 4.

Figure 10 is a view of the operating means for the corner grinders and is taken along the lines 10—10 of Figure 2.

Figure 11 is a perspective view of means for finishing the slot in the skirt about the vent opening in a storage battery cell cover.

Figure 12 is a plan view of an upper side of a storage battery cell cover.

Figure 13 is a section taken along the lines 13—13 of Figure 12 showing the cell cover with inserts of that figure.

Figure 14 is an elevational view of a reamer with which is combined a tool for shaping the outer surface of the projecting part of a metal insert in the storage battery cell cover.

Figure 15 is an elevational view of a reamer with which is combined a facing tool.

Figure 6:
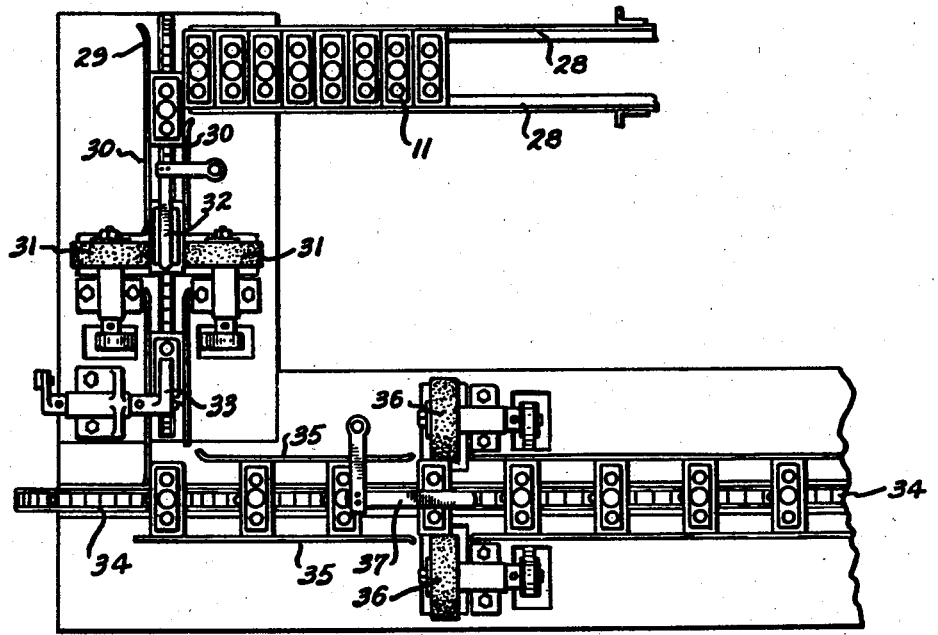
Figure 6 is a plan view of side and end grinding means of known form, which may be taken in connection with Figs. 1 and 2 to show the relationship of my mechanism to it.

Referring first to Figures 12 and 13, I have shown an exemplary type of battery cell cover 11. This is a domed body having edge flanges 12, openings 13 for the terminals of the plates in the cells, and a vent opening 14. The terminal openings are fitted with metal bushings 15. The cell cover is made usually by moulding and curing a hard rubber composition under heat and pressure; and the metal inserts are moulded in position. After the moulding and curing a good deal of work remains to be done on the cell cover. The flashes or fins have to be cut away. The side edges 16 and end edges 17 of the flanges have to be accurately ground to size so that the cell cover will fit accurately within the cell walls. The grinding of the side and end edges, originally done by hand, has more recently been done upon a machine which I shall describe briefly hereinafter because the specific mechanism with which the present invention concerns itself is conveniently added onto or made a part of the grinding machine for the side and end edges.

Also the corners 18 of the cell cover have to be rounded off or beveled. This has usually been done by grinding, and has hitherto been a hand operation.

As to the terminal openings 13, the interior 19 of the metal inserts has to be reamed accurately to size. The top edges 20 have to be made smooth and accurate, and the outside edges of the projecting parts of the metal inserts have to be finished by an outside finishing tool because connector lugs are usually placed over them and burned into position. Likewise, the under edges both of the metal inserts and of the adjacent collar of the cell cover have to be cut smooth as at 22, and the bottom portion of the metal insert is usually beveled as at 23.

All fins have to be removed from about the filling opening 14, the top edges of the opening have to be smoothed as at 24 and beveled as at 25. The depending skirt 26 of the filling opening may be treated or not as desired; but it is usually reamed to get rid of any skin or diaphragm occurring at this point. In any event the gas vent slots 27 must be formed if not already formed in the moulding, and must be cleaned out.

All of these operations have hitherto been performed by hand so that in plants making cell covers there has been a long line of operators with specialized machines performing these several operations individually.

I have indicated hereinabove that the grinding of the side and end edges has been performed by machine. I have illustrated the general features of such a machine in Figure 6. Here the cell covers 11 are placed upon guides or a conveyor 28 and are delivered to a chain conveyor 29 by which they are carried endwise in interspaced relationship (being confined by guides 30) past interspaced rotating grinding wheels 31 by which the side edges are ground. During the grinding of the covers they may be held down onto the conveyor by means 32. Pusher means 33 deliver the cell covers to another chain conveyor 34 by which they are moved sidewise in interspaced relationship between guides 35. They are carried between rotating interspaced grinding wheels 36 by means of which the end edges are ground; and they may be held down during this operation by means 37.

In Figure 1, I have shown in plan view, an apparatus which either may be used alone or may be used in conjunction with the apparatus for grinding the side and end edges of the cell cover. I have indicated the termination of the conveyor 34 in Figure 1. From this conveyor the cell covers are transferred to carriages 38 on another conveyor 39, and ultimately to still another conveyor 39a, both of which conveyors have a step-by-step movement. The cell covers are advanced to different work stations, where different operations are performed on them. I have indicated at 40 a station at which the corners of the flanges of the cell covers are beveled or rounded by grinding. This is accomplished by means of grinding wheels 41, 42, 43, and 44, specially shaped for the purpose. Pairs of these wheels are mounted upon shafts 45 and 46 and are rotated; and in proper timed relationship to the movements of the conveyor 39, the wheels are brought in against the corners of the cell cover flanges. These means will be more fully described hereinafter.

At 47, 48 and 49, I have indicated generally various work stations at which reamers operate upon the cell covers. At 50, is a station at which the gas grooves 27 are formed and/or cleaned out.

Taking up these several elements in order, the conveyor chains 39a pass over sprockets 51, 52, 53 and 54, mounted respectively upon the frame 55 of the machine. As I have indicated, the conveyors 39 and 39a move in a step-by-step fashion. The machine assembly illustrated in Figure 1 may have a separate source of power, or it may be driven from the drive for the apparatus of Figure 6. In Figure 2, I have shown the chains 34, passing over sprockets 56 and 57, the latter of which is fastened to a shaft 58. This shaft is connected by beveled gears 59 to a drive shaft 60 extending longitudinally of the machine. A clutch 61 is located along the length of this shaft intermediate the bevel gears 59 and the devices driven by the shaft 60. This clutch is operated by a handle 62 through suitable linkage 63. The shaft 60 is connected by bevel gearing 64 with a transverse shaft 65 journaled on the bed of the machine near its right hand end as shown in Figures 2 and 4. The shaft 65 may be fitted with a hand wheel 66 for manual jogging or rotation of the machine if desired. The shaft 65, as best shown in Figs. 4 and 5, bears a gear 67 which meshes with a gear 68 on a stud. This gear bears a sprocket 69, which is connected by a chain 70 to a sprocket 71. To this sprocket there is connected the driving member 72 of a Geneva movement, the cross wheel 73 of which is mounted upon a shaft 74, which bears the sprockets 52 for the conveyor chains 39a. The shaft 74 may be fitted with a brake 75 to prevent over-running of the conveyor.

The sprockets 51 of the conveyor 39a are mounted upon the same shaft as sprockets 51a for the conveyor 39. The sprockets 51b for the other end of the conveyor 39, though they may be located upon the same shaft are rotatably mounted with respect to the sprocket 56 for the conveyor 34, so that the movement of the conveyor 34 does not affect the movement of the conveyors 39 and 39a, which, as has been explained, are moved in a step-by-step manner through the Geneva mechanism from the shaft 60.

The shaft 60 bears a gear shown best at 76 in Figure 5. This gear meshes with a large gear 77, in the face of which a cam groove 78 is cut. A lever 79 is shown pivoted to the frame 55 at 80 in Figure 4. It bears a cam follower roller 81, lying in the cam groove. The end of the lever 79 is connected by a linkage 82 with an arm 83, fastened to the shaft 84, which extends longitudinally of the machine. Through the rotations of the gear 77 and the operation of the mechanism, just described, the timing shaft 84 is rocked back and forth.

The drive for the corner grinding mechanism is best appreciated from a consideration of Figures 1 and 2 and 10. The grinding wheels, in pairs, are mounted, as shown on the shafts 45 and 46. These shafts are carried on arms 85 and 86, pivoted respectively at 87 and 88. The shaft 84 bears a gear 89 which meshes with a gear 90, mounted on a stud on the frame. The ends of the arms 85 and 86 are connected respectively by links 91 and 92 with eccentric pivot pins 93 on the gear 90. Thus, when the shaft 84 rocks the gear 90, the two pairs of grinding wheels 41, 42 and 43, 44, are caused to approach and recede from each other; and this action is carried on in timed relationship to the movements of the conveyor. As the two pairs of grinding wheels approach each other, they contact and grind the corners of the cell cover flanges. They are specially shaped to give the desired corner contour.

The construction of the reaming heads will best be appreciated from Figures 2, 3, 4, 7 and 8. The lower reamer heads are essentially the same as the upper ones, but are in inverted position. Extending longitudinally of the machine I provide a bar 94, which bears upper and lower track members 95 and 96. Each track is provided with a rack 97 or 98. Each reamer head has a carriage 99 for a base; and this carriage is slidable on the track member 95 or the track member 96. In each carriage, there is a shaft 100 bearing a pinion 101 meshing with the rack. The end of the shaft is squared as at 102 or otherwise fitted for engagement with a wrench or removable hand wheel. By these means the position of the reaming heads may be adjusted longitudinally of the machine.

Each reamer head has a post 103, which is mounted upon a base 104 slidable in ways on the carriage 99. These ways are transverse to the direction of the track members 95 and 96. A lug 105 on the base 104 is perforated and threaded to accept a threaded shaft 106 rotatably, but not slidably movable in the carriage 99. The end of this shaft is likewise squared as at 107 or treated for engagement with a removable wrench, wheel or handle. By these means, adjustment of the reaming heads transversely of the machine is provided.

A cross arm 108 is slidably mounted upon the post 103. It may be adjusted as to height by means of a threaded shaft 109, engaging the arm, and rotatably but not slidably mounted in a bracket 110 fastened to the top of the post, the shaft being provided with a hand wheel or the like 111.

It is convenient to provide a separate motor drive for each reaming head. I have therefore shown a motor 112 fastened to one end of each arm 108. At the other end of the arm, a sleeve 113 may be mounted upon ball bearings 114. This sleeve bears a pulley 115 connected by a belt 116 to the motor 112. The operating shaft 117 of the reamer is slidably but non-rotatably mounted in the sleeve 113. At one end this shaft bears a suitable chuck for the reamer bits, as at 118. It also carries a rotatable sleeve 119 which is fixed as to its longitudinal position upon the operating shaft 117. This sleeve is provided with rack teeth 120. A gear 121 mounted upon a shaft 122 journaled in the arm 108 meshes with the teeth on the sleeve and forms the means for raising and lowering the operating shaft of the reamer. An arm 123 fixed on the shaft 122 is connected by a suitable linkage 124 with an arm 125 fixed on the shaft 84. By these means, the reamer heads are operated in timed sequence to the movements of the conveyor.

Figure 9:
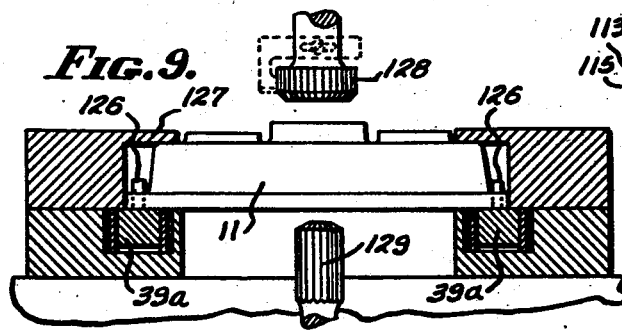
Figure 9 is a sectional view through the machine showing the relationship of reaming heads to the work being operated upon and is taken along the lines 9—9 of Figure 2.
Figure 8:
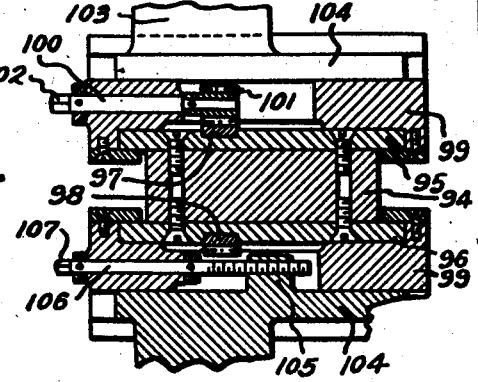
Figure 8 is a sectional view through the cross heads of a reaming device taken along the lines 8—8 of Figure 2.
Figure 7:
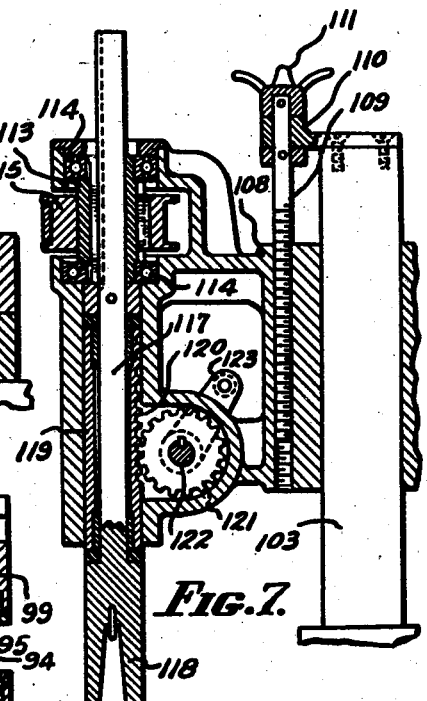
Figure 7 is a sectional view through a reaming head taken along the lines 7—7 of Figure 2.

As shown in Fig. 9, the conveyor chains 39a bear pins 126 for properly positioning the cell covers; and the cell covers are carried along beneath projecting guide members 127 which hold the cell covers down as the reaming tools are withdrawn from them.

The various reaming operations may be different for different types of cell covers; but by means which I have described, adjustment of the reamer heads may be made to take care of different styles of cell covers. Likewise, the reamer bits may be of any character appropriate to the task which they are to perform. Exemplary types of reamer bits are shown at 128 and 129 in Figure 9. In Figure 14, I have shown a reamer bit including an internal reamer 130, having an attachment 131 with cutting surfaces 132, 133 and 134 for cutting respectively the top, the outer surface, and a shoulder upon a metal insert 15. In Figure 15, I have shown a taper reamer 135 fitted with an attachment 136 for smoothing an annular surface.

In my machine, it will be understood, of course, that there are as many of the reamer heads as may be required for the several operations to be performed.

At work station 50 on my machine, I provide means for forming and/or cleaning out the gas grooves 27 on the under side of the skirt 26 of the filling opening of the cell cover. These means comprise preferably a small circular saw 137 fixed on a shaft 138 journaled in a swinging arm 139. The arm is pivoted by means of a shaft 140 to a bracket 141 fastened to the frame of the machine. A pulley 142 is fastened to the shaft 138, and is connected by means of a belt 144 with a pulley 143 on the shaft 140. A pulley 145 on the other end of the shaft 140 is connected by means of a belt 146 to a motor 147. It will be evident in this construction that the arm 139 may be raised or lowered without disturbing the drive of the saw 137. The bracket 141 is so fastened to the frame of the machine as to give to the saw 137 the correct angular relationship for cutting the gas grooves. It will be evident that as the cell covers reach the proper position at the work station 50, the gas grooves will be formed and/or cleaned out therein upon raising and lowering the arm 139. To this end I provide a mechanism also illustrated in Figure 11, wherein a lug 148 rests upon a cam 149 fixed on a shaft 150. This shaft is suitably journaled and supported as in a bracket 152 on the frame of the machine. An arm 151 is fixed to the shaft 150 and is connected by a suitable linkage 153 with an arm 154 on the shaft 84.

The operation of my machine will be clear from the foregoing. In the preferred embodiment of my machine which I have illustrated, the cell covers, in the condition in which they are taken from the moulds, are loaded onto the conveyor or guides 28 and in succession the several operations to which I have referred are performed on them, until at the end of the machine the cell covers are delivered in finished condition and ready for inspection.

Modifications may be made in my invention without departing from the spirit of it.

Having thus described my invention, what I claim as new and desire to secure by Letters Patent is:

1. In a machine of the class described, means for treating the corners of cell covers, said means comprising means for moving cell covers step-by-step in a straight line path, grinding means on each side of said path, said grinding means arranged in opposed pairs configured to contact the corner portions of cell covers when the pairs are moved inwardly in opposite directions, means for driving said grinding means, and means for moving said grinding means in against the corners of cell covers in timed relationship to the movements of said moving means, so as to contact and dress the corners of said cell covers during periods of rest thereof.

2. In a machine of the class described, a frame, a conveyor, a step-by-step drive for said conveyor, means for grinding the corners of cell covers, and means in connection with said drive for bringing said grinding means against said cell covers, said grinding means comprising a pair of grinding wheels on each side of said conveyor, shafts on which said wheels are mounted, driving means for said shafts, mounting means for said shafts whereby they may be moved concurrently toward and away from each other, a member moving in synchronism with said conveyor drive, and opposed connections between said last mentioned member and said mounting means for said shafts whereby said member produces concurrent movement of said shafts toward and away from each other.

3. The structure claimed in claim 2 wherein the grinding wheels of each pair are mounted upon a common shaft in parallelism, spaced so as to contact adjacent corners of a cell cover, and wherein adjacent edges of the wheels of each pair are beveled inwardly and spaced to grind a contour on the edges of the flanges of said cell covers.

OLIVER O. RIESER.